United States Patent [19]

Tani et al.

[11] Patent Number: 4,458,549
[45] Date of Patent: Jul. 10, 1984

[54] SELECT RETURN MECHANISM FOR A TRANSMISSION

[75] Inventors: Akira Tani; Yasuo Kito, both of Okazaki, Japan

[73] Assignees: Toyota Jidosha Kogyo Kabushiki Kaisha; Manno Kogyo Company, Limited, both of Aichi, Japan

[21] Appl. No.: 342,415

[22] Filed: Jan. 25, 1982

[30] Foreign Application Priority Data

Aug. 12, 1981 [JP] Japan .............................. 56-127031
Aug. 28, 1981 [JP] Japan .............................. 56-135885

[51] Int. Cl.³ .......................... G05G 9/16; F16F 1/06
[52] U.S. Cl. ................................ 74/473 R; 267/150; 267/155
[58] Field of Search ............... 74/473 R, 475, 476, 74/477; 267/150, 155

[56] References Cited

U.S. PATENT DOCUMENTS

| | | | |
|---|---|---|---|
| 1,030,229 | 6/1912 | Cheney | 267/150 X |
| 3,793,901 | 2/1974 | Muller et al. | 74/473 R |
| 4,143,560 | 3/1979 | Kinkade | 74/476 X |
| 4,269,081 | 5/1981 | Peterson et al. | 267/150 X |
| 4,299,135 | 11/1981 | Gens | 74/473 R X |
| 4,333,360 | 6/1982 | Simmons | 267/150 |
| 4,350,055 | 9/1982 | Pinomaki | 267/150 X |

Primary Examiner—Allan D. Herrmann
Attorney, Agent, or Firm—Parkhusrt & Oliff

[57] ABSTRACT

The essential feature of the invention includes that both ends of a single torsion spring are elongated to form both arms which are engaged with a swinging lever actuated by the select operation and a fixed lever in such a manner that select return force at high and low gear position in select operation is equalized. Further feature of the invention is that a select return spring is provided at an area defined independently from the select shaft and a bell crank shaft.

6 Claims, 9 Drawing Figures

SELECT RETURN MECHANISM FOR A TRANSMISSION

BACKGROUND OF THE INVENTION

This invention relates to a select return mechanism used mostly for a transmission of a remote control type in an internal combustion engine.

In general, the select return mechanism of this type is provided with individual springs in order to obtain return forces at high and low select operations. With this arrangement, a deviation of acting points of each spring on a designed portion of the select return mechanism is apt to be created at high and low select operations, resulting in unstableness in select return forces. The individual springs are engaged with a rotational member at its one end and with a fixed member at its other end, resulting in a deviation from a designed acting points at both ends of each spring and a variation in select return forces, and thereby rendering a possibility of undue force to be applied to the spring itself.

Further, such springs are typically provided at a limited area such as on a support shaft of a member rotatable by select operation, and as the result, a space for mounting the springs is apt to be limited and operational efficiency in assembling the select return mechanism will be reduced. Additionally, these factors may lead to a large structure of the select return mechanism.

SUMMARY OF THE INVENTION

Accordingly, a primary object of the present invention is to provide a select return mechanism wherein select return forces at high and low gear positions in select operation are equalized.

Another object of the present invention is to provide a select return mechanism wherein an undue force such as a twisting moment does not act on a torsion spring.

A further object of the present invention is to provide a select return mechanism which may be skillfully installed in the existing space.

Yet another object of the present invention is to provide a select return mechanism wherein the structure is simplified and the operational efficiency in assembling the same is improved.

According to the present invention, a single torsion spring is used and both ends of the single torsion spring are elongated to form both arms which are engaged with a swinging lever actuated by the select operation and a fixed lever in such a manner that select return forces at high and low gear positions in select operation are equalized. A further feature of the present invention is that a single torsion spring is provided at an area independent of a select shaft and a bell crank shaft.

Various general and specific objects, advantages and aspects of the invention will become apparent when reference is made to the following detailed description considered in conjunction with the accompanying drawings.

DETAILED DESCRIPTION OF THE PREFERRED EMBODIMENTS

Figure 1:
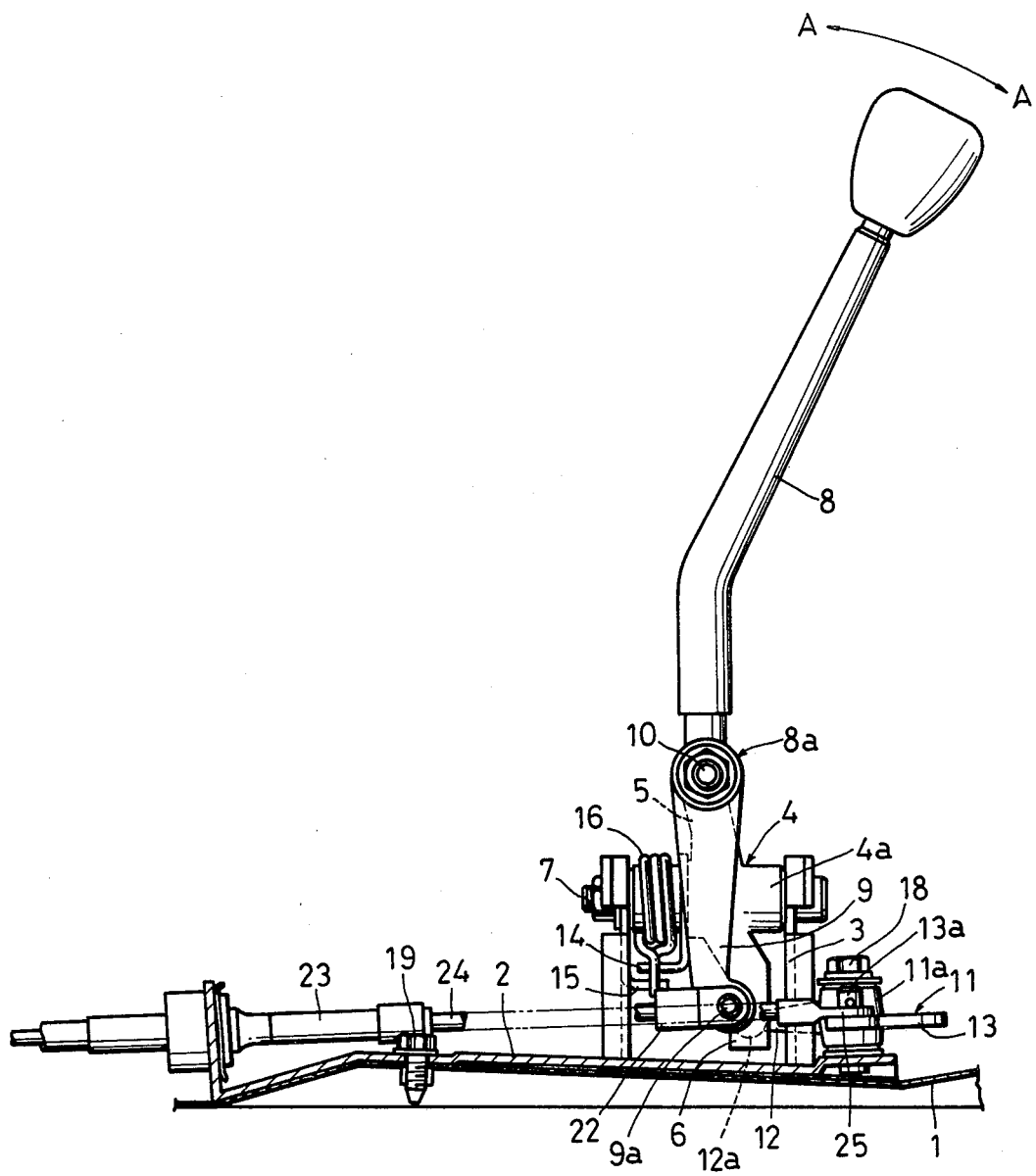
FIG. 1 is a side view, partially in section, of a support portion of a shift lever of a transmission of remote control type.
Figure 2:
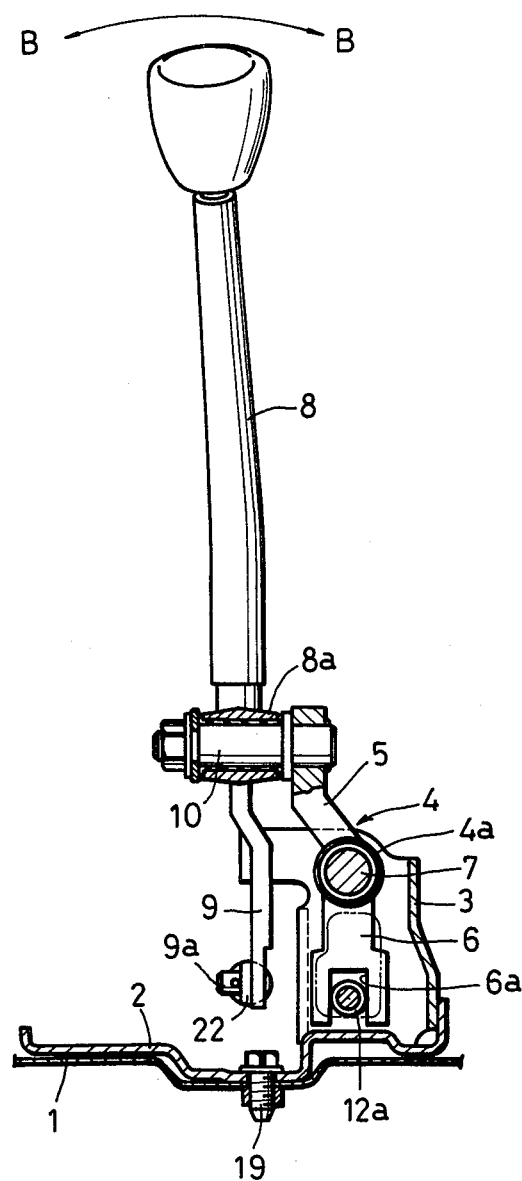
FIG. 2 is a rear elevation, partially in section, viewed from a right hand side in FIG. 1.
Figure 3:
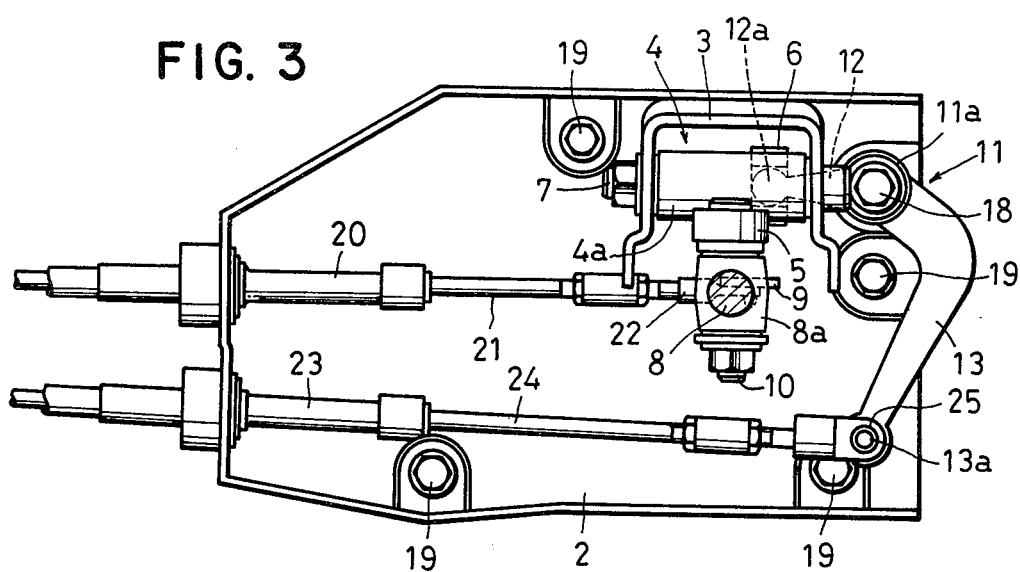
FIG. 3 is a plan view of FIG. 1, the shift lever being broken away.

Referring first to FIGS. 1-3, a shift lever retainer 2 is fixed to a floor 1 of an automotive body by a plurality of bolts 19. An upright member 3, which is generally of U-shaped configuration in a plan view, is mounted onto the retainer 2. A select shaft 7 is supported to the upright member 3 at its both ends. A boss 4a of a shift lever support 4 is pivotally supported on the select shaft 7. The shift lever support 4 is provided with an arm 5 extending upwardly from the boss 4a and with a lever 6 extending downwardly from the boss 4a and having a groove 6a at its lower end. A shift shaft 10 is supported to the arm 5 of the support 4. A boss 8a of a shift lever 8 is pivotally supported on the shift shaft 10. The shift lever 8 is integrally formed with a shifting lever 9 extending downwardly from the boss 8a. A pin 9a is integrally projected from one end of the shifting lever 9.

As shown in FIG. 3, a select bell crank 11 is provided on the shift lever retainer 2. A boss 11a of the bell crank 11 is pivotally supported on a bell crank shaft 18 extending upwardly from the retainer 2. As seen in the structure of the bell crank 11, an arm 12 extending from the boss 11a is formed to provide a spherical portion 12a at its one end. The spherical portion 12a is received into the groove 6a formed at the lower end of the lever 6 of the shift lever support 4 in a ball joint fashion (See FIG. 2.), while at one end of another arm 13 extending from the boss 11a, a pin 13a is integrally formed with the arm 13 and projected therefrom.

A hook 22 is formed at one end of an inner cable rod 21 of a shifting cable 20 using a push-pull cable. The hook 22 is connected to the pin 9a of the shifting lever 9. Similarly, a hook 25 is formed at one end of an inner cable rod 24 of a selecting cable 23 using a push-pull cable. The hook 25 is connected to the pin 13a of the arm 13. In a shift operation as depicted by an arrow A—A in FIG. 1 wherein the shift lever 8 is swung about the shift shaft 10, the inner cable rod 21 of the shifting cable 20 is pushed and pulled through the motion of the shifting lever 9, thereby providing a desired shift position in a transmission (not shown). On the contrary, in a select operation as depicted by an arrow B—B in FIG. 2 wherein the shift lever 8 is swung about the select shaft 7 together with the shift lever support 4, the select bell crank 11 is operatively swung about the bell crank shaft 18, coacting with the lever 6 of the support 4. This causes the inner cable rod 24 of the selecting cable 23 to be alternately pushed and pulled, thereby providing a desired select position in a transmission.

Figure 4:
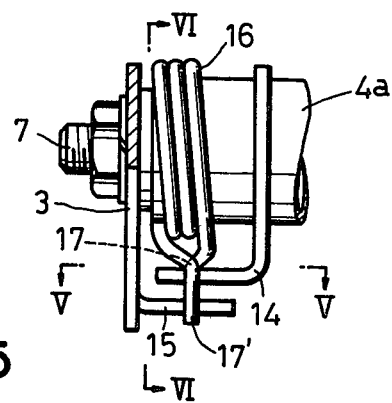
FIG. 4 is an enlarged side view of the essential part of FIG. 1.
Figure 5:
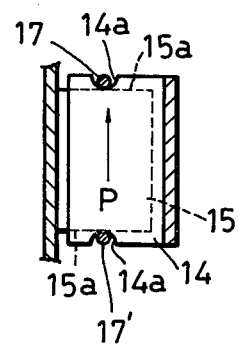
FIG. 5 is a cross sectional view taken along the V—V line in FIG. 4.
Figure 6:
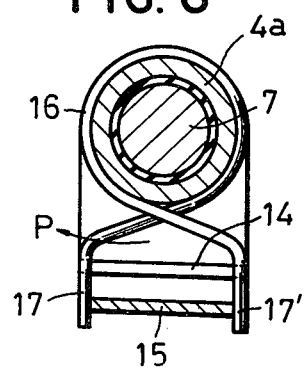
FIG. 6 is a cross sectional view taken along the VI—VI line in FIG. 4.

In such a transmission, there is normally provided a select return mechanism which is effective to return the shift lever to a neutral position or a select return position. Referring particularly to FIGS. 4-6 for purposes of explanation of the select return mechanism, a swinging lever 14 is provided at the boss 4a of the shift lever support 4. The swinging lever 14 is mounted on the boss 4a and extends integrally downwardly therefrom and bends forwardly (in the left hand direction in FIGS. 4 and 5), while a fixed lever 15 is provided at the upright member 3 of the shift lever retainer 2 and is formed to project rearwardly (in the right hand direction in FIGS. 4 and 5) under the swinging lever 14. As should be apparent in FIG. 5, when the shift lever 8 is in its neutral position, the fixed lever 15 is positioned directly under the swinging lever 14. In other words, the recess 14a formed at both side edges of the swinging lever 14 and the both side edges 15a of the fixed lever 15 are in the same two vertical planes.

A coiled torsion spring 16 used as a select return spring is inserted on the outer circumference of the boss 4a of the shift lever support 4. Both ends of the spring 16 are extended downwardly to from a pair of arms 17 and 17'. As will be apparent in FIGS. 4 and 6, both of these arms 17 and 17' extend downwardly from a nearly central point of the axial length of the spring 16. The both arms 17 and 17' are biased against the both recesses 14a of the swinging lever 14 and the both side edges 15a of the fixed lever 15 by the preset spring force. (See FIGS. 5 and 6.) Both acting points or abuting points of both arms 17 an 17' on the swinging lever 14 are in the directly opposite positions of the swinging lever 14.

In the select operation of the shift lever 8 as depicted by an arrow B—B in FIG. 2, the shift lever 8 is swung about the select shaft 7', coacting with the support 4. The rotation of the support 4 causes the swinging lever 14 formed integrally with the boss 4a to swing about the select shaft 7. For example, in the case that the shift lever 8 is select-operated to a high gear position (or a low gear position) and correspondingly the swinging lever 14 moves in the direction as depicted by an arrow P in FIGS. 5 and 6, the arm 17 of the torsion spring 16 moves with the swinging lever 14. However, the arm 17' firmly abuts against the side edge 15a of the fixed lever 15, so that it is retained at the previous position. As the result, a torsional moment is exerted to the spring 16 and a moment in the return direction is created. Accordingly, when a select operational force is relieved from the shift lever 8, the shift lever 8 is forced to return to the neutral position by a resilient force of the spring 16. On the contrary, in the event that the swinging lever 14 moves in the reverse direction of the arrow P, the arm 17 is retained at the previous position by the fixed lever 15, and the arm 17' moves with the swinging lever 14, thereby providing a select return action in the same way as in the previously mentioned case.

Since the acting points of both arms 17 and 17' of the torsion spring 16 on the swinging lever 14 are in the directly opposite positions of the swinging lever 14 as herein before described, the select return force exerted by the spring 16 is stably equalized at the high and low gear positions. Furthermore, the alignment of the acting points of both arms 17 and 17', in other words, the arrangement such that the forces of arms 17 and 17' at their acting points on the swinging lever 14 and the fixed lever 15 exist in a same plane, and the provision of the torsion spring 16 about the select shaft 7 prevent the excessive force such as a twisting moment from being applied to the spring 16.

Figure 8:
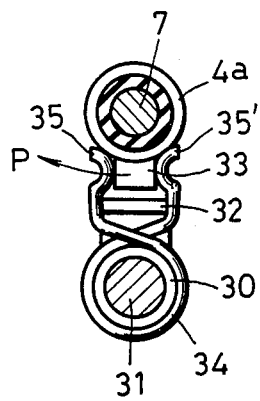
FIG. 8 is a cross sectional view taken along the VIII—VIII line in FIG. 7.
Figure 7:
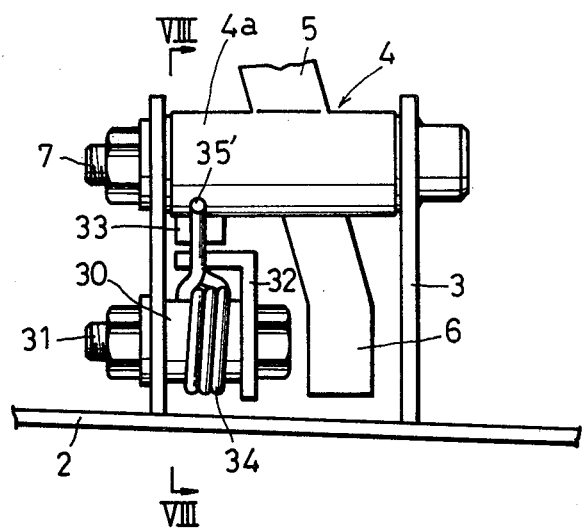
FIG. 7 is an enlarged side view of the essential part of another embodiment according to the invention.
Figure 9:
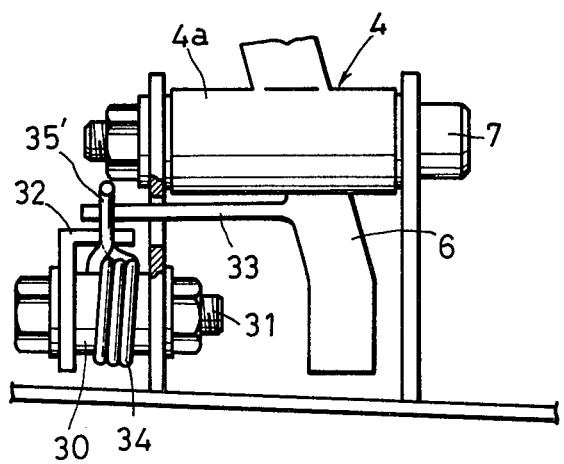
FIG. 9 is a side view of the essential part of still another embodiment which is modified from the embodiment shown in FIG. 7.

Referring next to FIGS. 7 and 8 which illustrate another embodiment of the present invention, a cylindrical set shaft 30 is fastened to the upright member 3 of the shift lever retainer 2 with a bolt 31 by utilizing a space defined in the lower area of the boss 4a of the shift lever support 4. A coiled torsion spring 34 used as a select return spring is inserted about the set shaft 30. Both ends of the spring 34 are extended upwardly from a nearly central point of the axial length of the spring 34 to form a pair of arms 35 and 35'.

An angle shaped lever 32 is fixed to the set shaft 30 and its forwardly (in the left hand direction in FIG. 7) extending portion is positioned between both arms 35 and 35' of the spring 34. A swinging lever 33 is integrally formed with and projects downwardly from the undersurface of the boss 4a of the shift lever support 4 and is also positioned between both arms 35 and 35' of the spring 34. In other words, when the shift lever 8 is in the neutral position, the fixed lever 32 is positioned directly opposite to or directly under the swinging lever 33 and both arms 35 and 35' of the spring 34 firmly bias against both side edges of the fixed lever 32 and the swinging lever 33 by the preset resilient force of the spring 34. The acting points (or the abutting points) of both arms 35 and 35' on both levers 32 and 33 are in alignment condition.

In a similar manner as described with reference to the previous embodiment, when the shift lever 8 is select-operated in the high or low gear position and correspondingly the swinging lever 33 moves in the direction as depicted by an arrow P in FIG. 8, the arm 35 of the spring 34 moves in the same direction, coacting with the swinging lever 33. However, the arm 35' of the spring 34 biases against the side edge of the fixed lever 32 and is retained at the previous position. This causes a torsional moment to be applied to the spring 34 and a moment in the return direction to be created. As the result, when a select operational force is relieved from the shift lever 8 in this state, the shift lever 8 returns to the neutral position by the resilient force of the spring 34.

On the contrary, in the event that the swinging lever 33 moves in the reverse direction of the arrow P, the arm 35' moves with the swinging lever 33 and the arm 35 is retained at the previous position, thereby providing a select return action by the spring 34 in the same way as described in the above. Other functions associated with this embodiment is similar to the previous embodiment, and therefore the detailed description thereof is omitted.

Especially in this embodiment, each member for obtaining the select return force is assembled in an extra space defined in the lower area of the boss 4a of the shift lever support 4. This eliminates provision for larger structure of the select return mechanism and permits an assembling operation to be readily made.

In the event that there is no space for installing the select return mechanism inside of the upright member 3 of the shift lever retainer 2 or it is difficult to install the select return mecahnism inside of the upright member 3, the set shaft 30, torsion spring 34 and other associated member may be installed outside of the upright member 3. In this case, the swinging lever 33 is designed so as to extend from a part of the shift lever support 4 to the outer portion of the upright member 3.

Having thus described the preferred embodiments of the invention, it should be understood that numerous structural modifications and adaptations may be resorted to without departing from the spirit of the invention.

What is claimed is:

1. In combination with a transmission for automobiles of the type wherein a shift lever support is pivotably mounted on a select shaft attached to a shift lever retainer for effecting a select operation and a shift lever is pivotably mounted on said shift lever support for effecting a shift operation, a select return mechanism comprising:
- a swinging means secured to said shift lever support for moving with said support;
- a fixed means secured on said shift lever retainer for being stationary relative to said swinging means; and
- a torsion spring provided on one of said shift lever support and said fixed means, said torsion spring being effective to apply resilient forces to said swinging means and said fixed means in such a manner that the resilient forces act in the same plane at high and low gear positions of said shift lever.

2. In combination with a transmission for automobiles of the type wherein a shift lever support is pivotably mounted on a select shaft attached to a shift lever retainer for effecting a select operation and a shift lever is pivotably mounted on said shift lever support for effecting a shift operation, a select return mechanism comprising:
- a swinging means secured to said shift lever support for moving with said support;
- a fixed means secured on said shift lever retainer for being stationary relative to said swinging means; and
- a torsion spring provided on one of said shift lever support and said fixed means, said torsion spring being effective to apply resilient forces to said swinging means and said fixed means in such a manner that the resilient forces act in the same plane at high and low gear positions of said shift lever, said torsion spring having two ends extended to form a pair of arms and said both arms are arranged bias against a lever member projecting from said swinging means and said fixed means.

3. In combination with a transmission for automobiles of the type wherein a shift lever support is pivotably mounted on a select shaft attached to a shift lever retainer for effecting a select operation and a shift lever is pivotably mounted on said shift lever support for effecting a shift operation, a select return mechanism comprising:
- a swinging means secured to said shift lever support for moving with said support;
- a fixed means secured on said shift lever retainer for being stationary relative to said swinging means; and
- a torsion spring provided on one of said shift lever support and said fixed means, said torsion spring being effective to apply resilient forces to said swinging means and said fixed means in such a manner that the resilient forces act in the same plane at high and low gear positions of said shift lever, said torsion spring being arranged about a boss of said shift lever support.

4. In combination with a transmission for automobiles of the type wherein a shift lever support is pivotably mounted on a select shaft attached to a shift lever retainer for effecting a select operation and a shift lever is pivotably mounted on said shift lever support for effecting a shift operation, a select return mechanism comprising:
- a swinging means secured to said shift lever support for moving with said support;
- a fixed means secured on said shift lever retainer for being stationary relative to said swinging means; and
- a torsion spring provided on one of said shift lever support and said fixed means, said torsion spring being effective to apply resilient forces to said swinging means and said fixed means in such a manner that the resilient forces act in the same plane at high and low gear positions of said shift lever, said torsion spring being arranged about a set shaft provided at a space defined independently from the swinging means.

5. The select return mechanism as defined in claim 4 wherein said set shaft is provided at a space defined under said select shaft of said shift lever support.

6. In a transmission shift assembly including a shift lever retainer, a select shaft supported by said shift lever retainer, a shift lever support coupled for rotatable movement about said select shaft, a shift lever coupled to said shift lever support for effecting a shift operation, and a means for returning said shift lever to a neutral position, the improvement in said means for returning said shift lever to a neutral position comprising:
- a swinging lever coupled to and extending from said shift lever support;
- a fixed lever coupled to and extending from said shift lever retainer, said swinging lever and said fixed lever being in alignment in said neutral position; and
- a torsion spring means for providing resilient forces to said swinging lever and said fixed lever in response to shift lever movements so that substantially equal forces are applied to return said shift lever to the neutral position upon movement of said shift lever in either of two shift directions.

* * * * *